(12) United States Patent
Cho et al.

(10) Patent No.: US 10,585,684 B2
(45) Date of Patent: Mar. 10, 2020

(54) DEVICE, METHOD, AND COMPUTER PROGRAM PRODUCT FOR JOB EXECUTION CONTROL

(71) Applicants: Kabushiki Kaisha Toshiba, Minato-ku (JP); Toshiba Digital Solutions Corporation, Kawasaki-shi (JP)

(72) Inventors: Kenta Cho, Kawasaki (JP); Megumi Aikawa, Kawasaki (JP); Kouji Yasuda, Yokohama (JP); Hironobu Aoki, Kawasaki (JP)

(73) Assignees: Kabushiki Kaisha Toshiba, Minato-ku (JP); Toshiba Digital Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/707,446

(22) Filed: Sep. 18, 2017

(65) Prior Publication Data
US 2018/0189075 A1    Jul. 5, 2018

(30) Foreign Application Priority Data

Jan. 5, 2017 (JP) .................................. 2017-000329

(51) Int. Cl.
*G06F 9/44* (2018.01)
*G06F 9/451* (2018.01)
(Continued)

(52) U.S. Cl.
CPC ............ *G06F 9/451* (2018.02); *G06F 11/141* (2013.01); *G06F 11/1407* (2013.01);
(Continued)

(58) Field of Classification Search
CPC .... G06F 9/451; G06F 11/1407; G06F 11/141; G06F 9/445; G06F 9/5038; H04L 67/10
(Continued)

(56) References Cited

U.S. PATENT DOCUMENTS

| 2005/0166184 A1* | 7/2005 | Takao | G06F 9/451 |
| | | | 717/117 |
| 2011/0181900 A1* | 7/2011 | Suese | H04N 1/00413 |
| | | | 358/1.13 |

(Continued)

FOREIGN PATENT DOCUMENTS

| JP | 02-271427 A | 11/1990 |
| JP | 09-190476 A | 7/1997 |

(Continued)

OTHER PUBLICATIONS

Yamamoto, M., "Guide with more than in study job management in Hinemos. By the way, six times are operational starts! However, a lot of objects that are new when it begins?", NTT DATA base system business headquarters, Mar. 2015, 14 pages (with unedited computer generated English translation).

*Primary Examiner* — Anna C Deng
(74) *Attorney, Agent, or Firm* — Oblon, McClelland, Maier & Neustadt, L.L.P.

(57) ABSTRACT

According to an embodiment, a job execution control device controls execution of a job for receiving input data, applying processing thereto, and outputting output data. The device includes a job executor, a controller, a recorder, and a generator. The job executor executes a job and record a job execution history including the input and output data. The controller displays, on a display, a job screen for presenting information on the executed job to a user and for receiving a user operation for re-executing the executed job. The recorder records a job operation history regarding the user operation through the job screen. The generator generates a warning condition for input or output data of a job based on the histories. The controller appends to the job screen (Continued)

warning information associated with an executed job the input or output data of which satisfies the warning condition, among executed jobs.

9 Claims, 14 Drawing Sheets

(51) Int. Cl.
*G06F 11/14* (2006.01)
*G06F 9/50* (2006.01)
*H04L 29/08* (2006.01)
*G06F 9/445* (2018.01)

(52) U.S. Cl.
CPC ............ *G06F 9/445* (2013.01); *G06F 9/5038* (2013.01); *H04L 67/10* (2013.01)

(58) Field of Classification Search
USPC .......................................................... 717/117
See application file for complete search history.

(56) References Cited

U.S. PATENT DOCUMENTS

| | | | |
|---|---|---|---|
| 2014/0053105 A1* | 2/2014 | Sakata | H04N 21/44218 715/811 |
| 2014/0351362 A1* | 11/2014 | Shirakami | G06F 9/5027 709/213 |

FOREIGN PATENT DOCUMENTS

| | | |
|---|---|---|
| JP | 10-69517 | 3/1998 |
| JP | 2004-5205 A | 1/2004 |
| JP | 4581404 | 11/2010 |
| JP | 5598806 | 10/2014 |

\* cited by examiner

FIG.2

| JOB SET DEFINITION ID | NAME | JOB DEFINITION ID SEQUENCE |
|---|---|---|
| 1 | WORD DICTIONARY CREATION | 1, 2, 3, 4 |
| 2 | LANGUAGE MODEL CREATION | 5, 6, 7, 8, 9 |
| 3 | ACOUSTIC MODEL CREATION | 10, 11, 12 |
| ⋮ | ⋮ | ⋮ |

FIG.3

| JOB DEFINITION ID | NAME | DATA DEFINITION ID SEQUENCE OF INPUT DATA | DATA DEFINITION ID SEQUENCE OF OUTPUT DATA | EXECUTION FUNCTION |
|---|---|---|---|---|
| 1 | DOCUMENT IMPORT | 1 | 2 | retrieve_doc |
| 2 | WORD EXTRACTION | 2 | 3 | extract_word |
| 3 | DICTIONARY GENERATION | 3 | 4 | create_dic |
| 4 | ACCURACY EVALUATION | 4, 5 | 6 | evaluate_acc |
| ⋮ | ⋮ | ⋮ | ⋮ | ⋮ |

| DATA DEFINITION ID | NAME | TYPE DEFINITION ID |
|---|---|---|
| 1 | DOCUMENT | 1 |
| 2 | DOCUMENT FILE | LIST (DOCUMENT FILES: 2) |
| 3 | WORD | LIST (NOTATIONS: 3, READING: 3) |
| 4 | DICTIONARY FILE | 2 |
| 5 | EVALUATION DATA | 1 |
| 6 | CHARACTER ACCURACY RATE | 4 |
| ⋮ | ⋮ | ⋮ |

| TYPE DEFINITION ID | TYPE NAME | FEATURE |
|---|---|---|
| 1 | FOLDER | NUMBER OF FILES |
| 2 | FILE | SIZE |
| 3 | CHARACTER STRING | CHARACTER STRING LENGTH |
| 4 | RATIO | NUMERICAL VALUE |
| ⋮ | ⋮ | ⋮ |

FIG.6

| JOB ID | JOB SET ID | JOB DEFINITION ID | INPUT DATA | OUTPUT DATA | STATUS |
|---|---|---|---|---|---|
| 21 | 11 | 1 | '/foo/doc' | ['agenda.doc','slide.ppt'] | COMPLETED |
| 22 | 11 | 2 | ['agenda.doc','slide.ppt'] | [['...','...'],...] | COMPLETED |
| 23 | 11 | 3 | [['...','...'],...] | 'gen.dic' | COMPLETED |
| 24 | 11 | 4 | 'gen.dic', '/foo/eval' | 0.874 | COMPLETED |
| ... | ... | ... | ... | ... | ... |

161

[
[yu-u-za-e-ku-su-pe-ri-e-n-su, yu-u-za-e-ku-su-pe-ri-e-n-su],
[ya-su, ya-su],
[sa-gyou-shi-en, sa-gyo-u-shi-e-n],
[gi-tou, ],
[te-ki-su-to-ka, te-ki-su-to-ka]
]

DEVICE, METHOD, AND COMPUTER PROGRAM PRODUCT FOR JOB EXECUTION CONTROL

CROSS-REFERENCE TO RELATED APPLICATION

This application is based upon and claims the benefit of priority from Japanese Patent Application No. 2017-000329, filed on Jan. 5, 2017; the entire contents of which are incorporated herein by reference.

FIELD

An embodiment described herein relates generally to a device, a method, and a computer program product for job execution control.

BACKGROUND

Conventional techniques are present for making a user aware of a job that has not been normally executed so as to support re-execution of the job. However, in some cases, a finally obtained product does not satisfy the user even if the job has been normally executed. The conventional techniques are not capable of making the user aware of such a job that has been normally executed but may fail to obtain a satisfactory product so as to prompt the user to re-execute the job. Thus, improvement is needed. The term "job" herein refers to a unit of processing of receiving certain input data, applying predetermined processing thereto, and outputting the result thereof as output data. If a plurality of jobs are sequentially executed to obtain the final product, the set of the sequentially executed jobs is called a "job set". The job set is also called a job flow.

In speech recognition systems that perform speech recognition processing using a word dictionary, conventional techniques are known for additionally registering a word not registered in the word dictionary in response to a correction operation of the user to a recognition result. In these conventional techniques, if the word after being corrected by the user is not registered in the word dictionary, the word after being corrected is automatically additionally registered in the word dictionary. Due to this, in some cases, a word is additionally registered that rather adversely affects the speech recognition processing by being registered in the word dictionary. Thus, improvement is needed.

BRIEF DESCRIPTION OF THE DRAWINGS

FIG. 2 is a diagram illustrating examples of a job set definition;

FIG. 3 is a diagram illustrating examples of a job definition;

FIG. 4 is a diagram illustrating examples of a data definition;

FIG. 5 is a diagram illustrating examples of a type definition;

FIG. 6 is a diagram illustrating an example of a job execution history;

DETAILED DESCRIPTION

According to an embodiment, a job execution control device controls execution of a job serving as a unit of processing of receiving input data, applying processing thereto, and outputting output data representing a result of the processing. The device includes a job executor, a display controller, an operation history recorder, and a warning condition generator. The job executor is configured to execute a specified job and record a job execution history including the input data and the output data of the executed job. The display controller is configured to display, on a display device, a job screen for presenting information on the executed job to a user and for receiving a user operation for re-executing the executed job. The operation history recorder is configured to record a job operation history including an operation target item and operation content of the user operation performed using the job screen. The warning condition generator is configured to generate a warning condition for input data or output data of a job based on the job execution history and the job operation history. The display controller is configured to append warning information to the job screen, the warning information being associated with an executed job the input data or the output data of which satisfies the warning condition, among executed jobs presented to the user through the job screen. The display controller is configured to display the job screen with the warning information on the display device.

The following describes in detail the job execution control device, a job execution control method, and a computer program according to the embodiment with reference to the drawings. The job execution control device of the embodiment can be implemented, as an example, as a server of a server-client system using a network. In this case, the job execution control device presents the user a "job user interface (UI)" (job screen) serving as a user interface related to execution control of a job via a browser installed on a client terminal used by the user, and executes the processing in response to the user operation performed using the job UI. The user can use the job UI, for example, to specify a job to be executed, to set the input data and instruct the execution, to browse or correct the input/output data of the executed job, and to instruct the re-execution of the job based on the corrected input.

Figure 1:
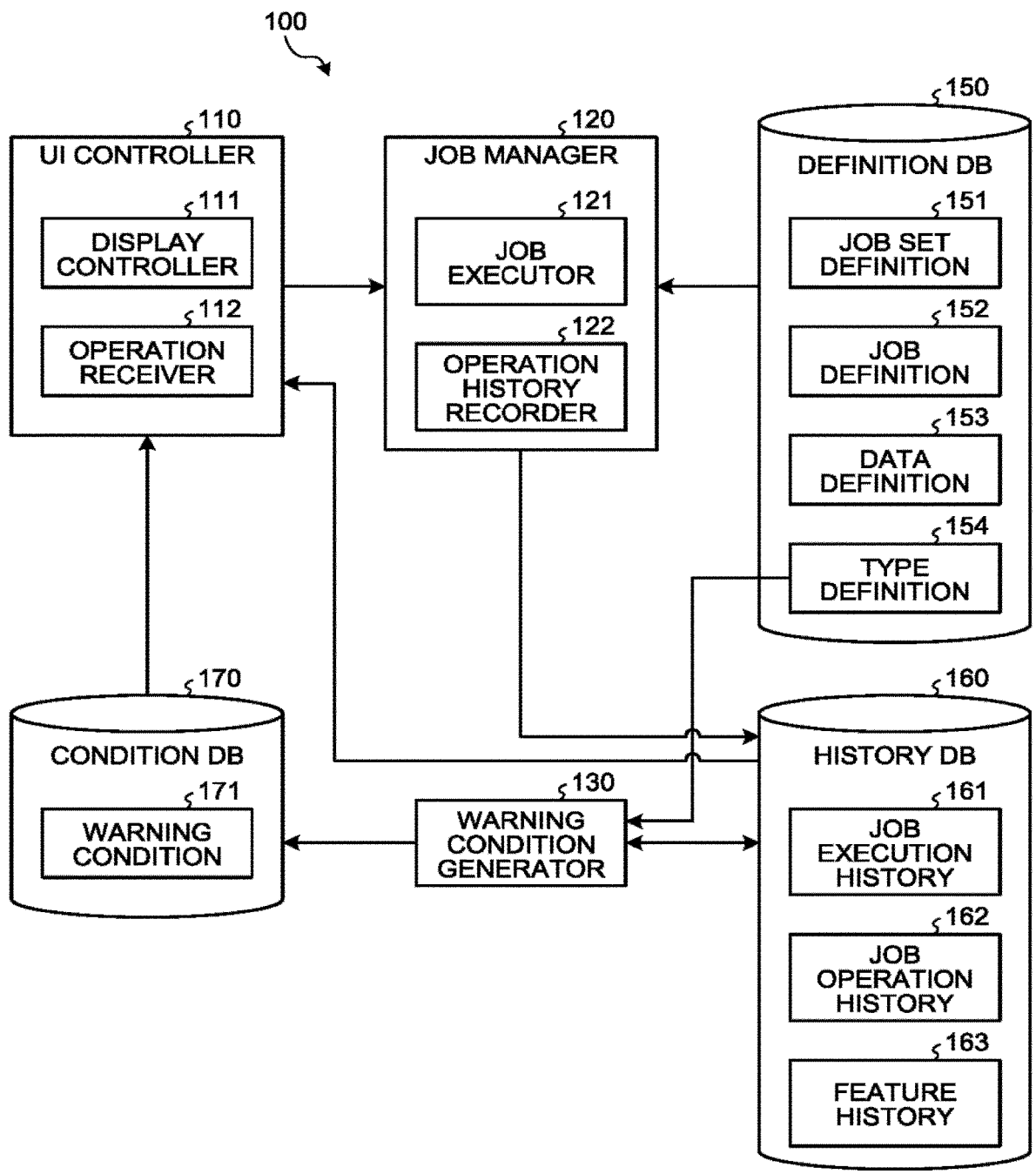
FIG. 1 is a block diagram illustrating a functional configuration example of a job execution control device.

FIG. 1 is a block diagram illustrating a functional configuration example of a job execution control device 100 of the present embodiment. As illustrated in FIG. 1, the job execution control device 100 includes a UI controller 110, a job manager 120, a warning condition generator 130, a definition database (DB) 150, a history DB 160, and a condition DB 170.

The UI controller 110 serves as, for example, a web server for presenting the user the above-described job UI in a web-based manner, and includes a display controller 111 and an operation receiver 112. The display controller 111 generates the job UI, and displays it on the display device of the client terminal. The operation receiver 112 receives the user operation performed using the job UI.

The job manager 120 has a function to manage, for example, the execution of the job in response to the user operation in cooperation with the UI controller 110, and includes a job executor 121 and an operation history recorder 122. The job executor 121 executes the job in response to the user operation performed using the job UI, and records a job execution history 161 including the input data and the output data of the executed job. The operation history recorder 122 records a job operation history 162 including the operation target item and the operation content of the user operation performed using the job UI.

The warning condition generator 130 generates a warning condition 171 for the input data or the output data of the job based on the job execution history 161 and the job operation history 162. After the warning condition is generated, the display controller 111 displays, on the display device of the client terminal, the job screen on which the warning information is appended to an executed job, among the executed jobs presented to the user through the above-described job screen, the input data or the output data of which satisfies the warning condition. This operation can make the user aware of a job among the executed jobs that may be preferably rechecked or re-executed after being corrected, and thus can prompt the user to recheck or re-execute the executed job.

The definition DB 150 stores a job set definition 151, a job definition 152, a data definition 153, and a type definition 154. The history DB 160 stores the job execution history 161 recorded by the job executor 121, the job operation history 162 recorded by the operation history recorder 122, and a feature history 163 generated by the warning condition generator 130. The condition DB 170 stores the warning condition 171 generated by the warning condition generator 130. The following describes more in detail the configuration and the operation of the job execution control device 100 of the present embodiment.

FIG. 2 is a diagram illustrating examples of the job set definition 151. As illustrated, for example, in FIG. 2, the job set definition 151 is stored in the definition DB 150 in a table form associating a "job set definition identifier (ID)", a "name", and a "job definition ID sequence" with one another.

The job set definition ID is identification information uniquely assigned to each individual element of the job set definition 151. The name is a name given to the job set definition 151. The job set definition ID sequence represents a plurality of jobs sequentially executed in a job set defined by the job set definition 151 and the execution order of the jobs. Each individual job is defined by the job definition 152 (to be described later), and thus, the job set definition ID sequence is formed by arranging job definition IDs (to be described later) for identifying the corresponding job definitions 152.

FIG. 3 is a diagram illustrating examples of the job definition 152. As illustrated, for example, in FIG. 3, the job definition 152 is stored in the definition DB 150 in a table form associating a "job definition ID", a "name", a "data definition ID sequence of input data", a "data definition ID sequence of output data", and an "execution function" with one another.

The job definition ID is identification information uniquely assigned to each individual element of the job definition 152. The name is a name given to the job definition 152. The data definition ID sequence of input data represents a type of input data of a job defined by the job definition 152, and the data definition ID sequence of output data represents a type of output data of the job defined by the job definition 152. The types of the input data and the output data of the job are defined by the data definitions 153 (to be described later), and thus, the data definition ID sequence of input data and the data definition ID sequence of output data are represented by data definition IDs (to be described later) for identifying the corresponding data definitions 153. The execution function represents a function with which the job defined by the job definition 152 receives the input data and returns the output data. The execution function is expressed by, for example, a function name of a program on the server or an identification name of a Web REST API.

FIG. 4 is a diagram illustrating examples of the data definition 153. As illustrated, for example, in FIG. 4, the data definition 153 is stored in the definition DB 150 in a table form associating a "data definition ID", a "name", and a "type definition ID" with one another.

The data definition ID is identification information uniquely assigned to each individual element of the data definition 153. The name is a name given to the data definition 153. The type definition ID represents a data type of the input data or the output data defined by the data definition 153. The data type of the input data or the output data is defined by the type definition 154 (to be described later), and therefore, is represented by the type definition ID (to be described later) for identifying the corresponding type definition 154. If a plurality of pieces of data can be entered, the type definition ID is defined as a list type, and indicates the name and type of each element of the list. For example, in the examples in FIG. 4, the data definition 153 having a data definition ID of "2" indicates that the type definition ID is the list type, and each element of the list is a "document file" having a type definition ID of "2"; and the data definition 153 having a data definition ID of "3" indicates that the type definition ID is the list type, and each element of the list is a combination of a "notation" having a type definition ID of "3" and "reading" having a type definition ID of "3".

FIG. 5 is a diagram illustrating examples of the type definition 154. As illustrated, for example, in FIG. 5, the type definition 154 is stored in the definition DB 150 in a table form associating the "type definition ID", a "type name", and a "feature" with one another.

The type definition ID is identification information uniquely assigned to each individual element of the type definition 154. The type name is a name given to the type definition 154. The type name may represent a data type, such as a character string for a path specifying a folder in a storage in the case of a folder, a character string for a path for identifying a file in the case of a file, data composed of a plurality of characters in the case of a character string, or a numerical value represented by a value of 0 to 1 in the case of a ratio. The feature represents a type of a feature to be noted in the input data or the output data having a data type defined by the type definition 154. When the warning condition 171 (to be described later) is generated, learning data can be generated from the input data or the output data of the executed job using the feature having the type defined by the type definition 154, and a model of a classifier corresponding to the warning condition 171 can be generated by machine learning using the learning data.

By appropriately referring to the job set definition 151, the job definition 152, the data definition 153, and the type definition 154 stored in the above-described definition DB 150, the job executor 121 sequentially executes jobs in a job set instructed for execution by the user using the job UI, and records the job execution history 161 in the history DB 160.

FIG. 6 is a diagram illustrating an example of the job execution history 161. As illustrated, for example, in FIG. 6, the job execution history 161 is recorded in the history DB 160 in a table form associating a "job ID", a "job set ID", the "job definition ID", the "input data", the output data", and a "status" with one another. The present embodiment assumes that, when, for example, the job executor 121 sequentially executes the jobs in the job set instructed for execution by the user, the above-listed items of the job execution history 161 are recorded (updated) as needed by the job executor 121 according to the progress of the execution.

The job ID is identification information uniquely assigned to each job executed by the job executor 121. The job set ID is identification information uniquely assigned to each job set instructed for execution by the user, and the same value of job set ID is recorded for a plurality of jobs in the job set. The job definition ID represents which of the jobs corresponds to which of the job definitions 152. The job set definition ID may be recorded together with the job definition ID.

Figures 7, 8:
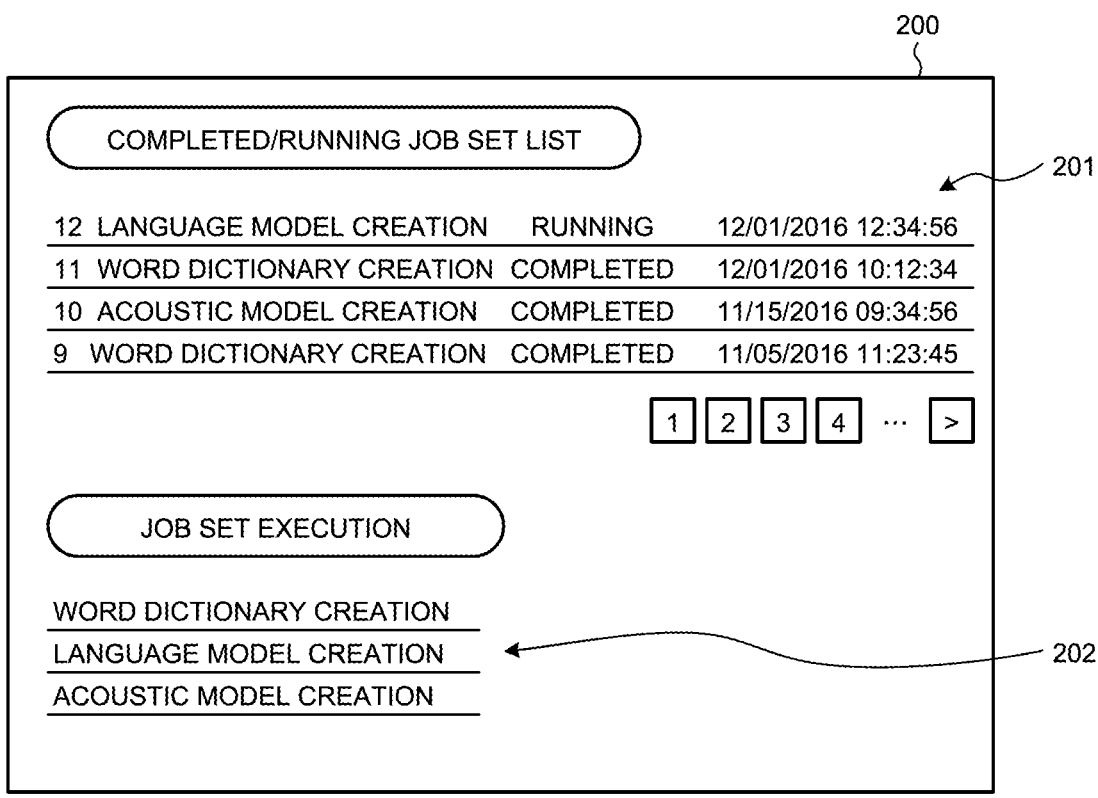
FIG. 7 is a diagram illustrating an example of data in a list form.
FIG. 8 is a diagram illustrating an example of a dashboard user interface (UI)

The entity of the input data or the output data (specific value of the input data or the output data) defined by the corresponding job definition 152 and the corresponding data definition 153 is recorded as the input data or the output data for each of the jobs. If the input data or the output data has a list form, for example, a list illustrated in FIG. 7 is recorded. FIG. 7 illustrates an example of the output data of a job having a job ID of "22" and the input data of a job having a job ID of "23" illustrated in FIG. 6 that serve as data in a list form. The list includes a plurality of elements, and each of the elements is a combination of two items of the notation and the reading. The reading is automatically given by checking the notation of a word extracted from a document using morphological analysis with a general dictionary or the like. If no applicable word is found, the field for the reading is left blank.

The status represents a status of each job, and is set to any of "waiting for execution" indicating a state before being executed by the job executor 121, "running" indicating a state of being executed by the job executor 121, and "completed" indicating a state of being completed by the job executor 121. Statuses may be available, such as "error" indicating an occurrence of an error during the execution of the job and "aborted" indicating an abortion of the job by the user.

The execution instruction of the job set is made by the user using the job UI as described above. The job UI is displayed on the display device of the client terminal by control of the display controller 111. The user operation using the job UI is received by the operation receiver 112. The job UI includes a dashboard UI (first screen), a job set execution UI, a job set details UI (second screen), and a job details UI (third screen), and is presented to the user through screen transition between these UIs in response to the user operation.

FIG. 8 is a diagram illustrating an example of the dashboard UI. The present embodiment assumes that the user logs into the job execution control device 100 under a certain account. After the login, a dashboard UI 200 such as that illustrated in FIG. 8 is displayed on the display device of the client terminal used by the user.

As illustrated in FIG. 8, this dashboard UI 200 includes a completed/running job set list 201 and a job set execution area 202 for selecting job sets to be executed. The completed/running job set list 201 is generated based on the job execution history 161, and displays information on, for example, the job set ID, the name, the status, and execution start time for each of the job sets instructed for execution by the user. The status of each of the job sets is set to "completed" if all the jobs included in the job set have been "completed", or to "running" if any "running" job or any job "waiting for execution" is present. Each of the job sets displayed in the completed/running job set list 201 is selectable for displaying the job set details UI (to be described later).

The job set execution area 202 displays a list of names of the job set definitions. If the user performs an operation to select any of the names from the job set execution area 202, the job UI displayed on the display device of the client terminal shifts from the dashboard UI 200 to a job set execution UI corresponding to the name selected by the user.

Figure 9:
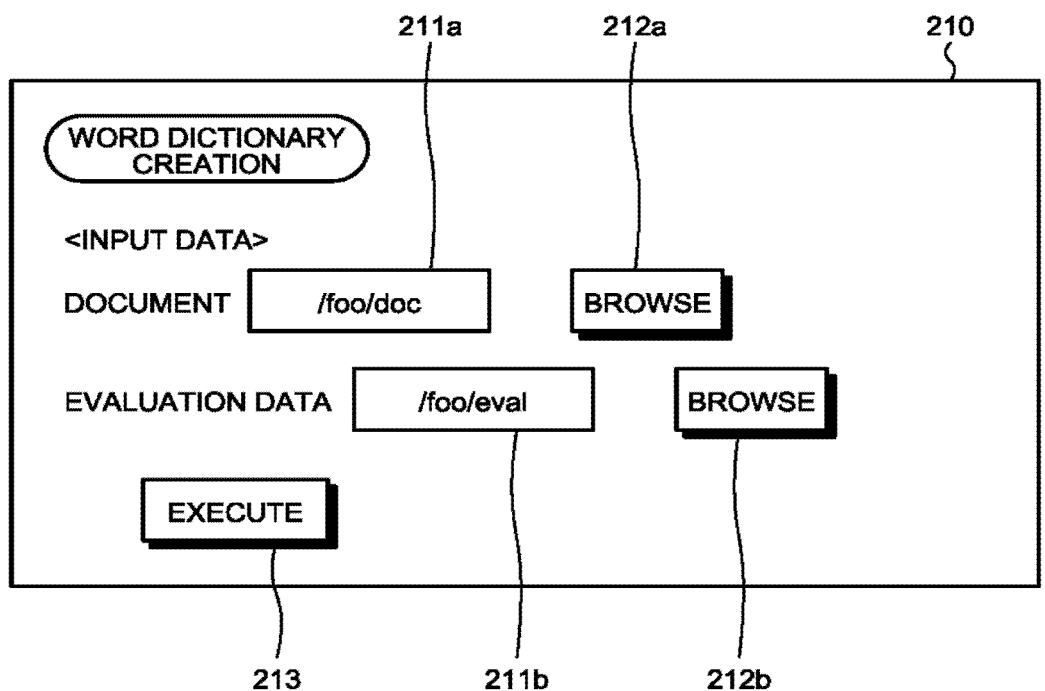
FIG. 9 is a diagram illustrating an example of a job set execution UI.

FIG. 9 is a diagram illustrating an example of the job set execution UI. If the user performs an operation to select "word dictionary creation" in the job set execution area 202 of the dashboard UI 200 in FIG. 8, a job set execution UI 210 such as that illustrated in FIG. 9 is displayed on the display device of the client terminal used by the user. This job set corresponds to an operation to create a word dictionary used in speech recognition.

As illustrated in FIG. 9, this job set execution UI 210 includes text boxes 211a and 211b and "browse" buttons 212a and 212b for specifying input data needed for the job set and an "execution" button 213 for instructing the execution of the job set. The input data needed for the job set refers to input data, among pieces of input data of respective jobs included in the job set, that cannot be obtained from outputs of other jobs. As illustrated in FIGS. 3 and 4, in the job set of "word dictionary creation", "document" serving as input data of "document import" and "evaluation data" serving as input data of "accuracy evaluation" cannot be obtained from outputs of other jobs. Therefore, the user specifies these pieces of input data using the text boxes 211a and 211b and the "browse" buttons 212a and 212b on the job set execution UI 210. If the user operates the "execution" button 213, the job executor 121 is started, and starts executing the job set instructed for execution.

Figure 10:
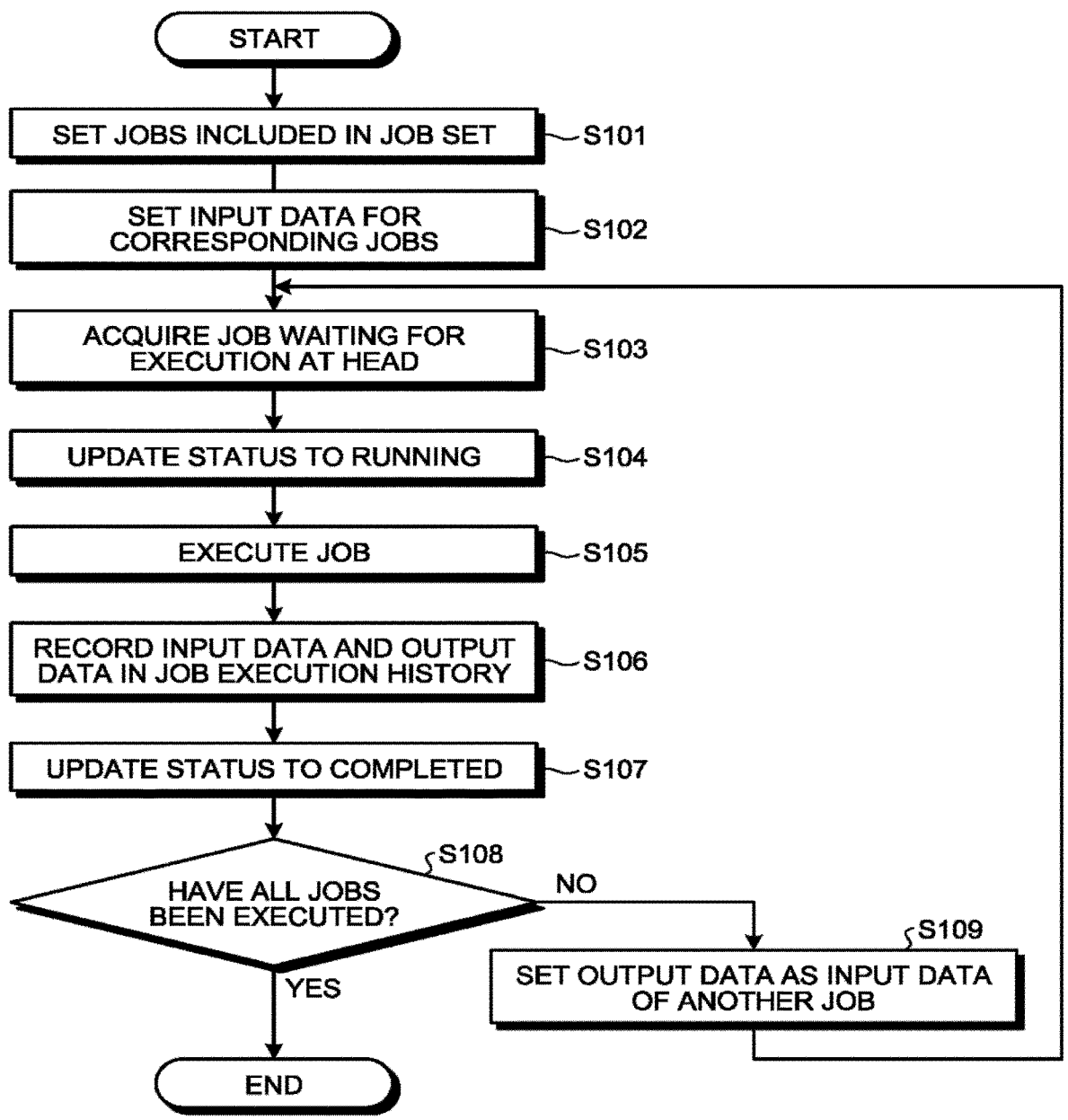
FIG. 10 is a flowchart illustrating a processing procedure when a job set is executed.

FIG. 10 is a flowchart illustrating a processing procedure when the job set is executed. If the user specifies the input data needed for the job set and operates the "execution" button 213 on the job set execution UI 210, the job executor 121 sets the respective jobs included in the job set instructed for execution in the job execution history 161 (Step S101). The input data specified on the job set execution UI 210 is set in the input data of corresponding jobs (Step S102). At this time, job IDs are assigned to the respective jobs in the order of execution in the job set, and sorted in the order of job IDs in the job execution history 161. All the jobs included in the job set are assigned with the same job set ID, and are set to the status of "waiting for execution".

Then, the job executor 121 acquires a job "waiting for execution" at the head in the job history (Step S103). The job executor 121 updates the status of the acquired job in the status of "waiting for execution" to "running" (Step S104), and passes the input data to an execution function to execute the job (Step S105).

After the execution of the job is completed, the job executor 121 records the input data and the output data of the job in the job execution history 161 (Step S106), and updates the status of the job to "completed" (Step S107). The job executor 121 checks whether all the jobs included in the job set instructed for execution has been executed (Step S108). If any job "waiting for execution" is present (No at Step S108), the job executor 121 sets the output data of the job completed in execution as the input data of another job (Step S109), and returns the process to Step S103 to repeat the processing thereafter. If all the jobs included in the job set instructed for execution has been executed (Yes at Step S108), the sequence of processes ends.

The user can use the job set details UI and the job details UI of the job UI to check the details of the executed job and to perform operations, such as correcting the input data and then instructing the re-execution.

If the user performs an operation to select any of the job sets displayed in the completed/running job set list 201 in the above-described dashboard UI 200, the job UI displayed on the display device of the client terminal shifts from the dashboard UI 200 to a job set details UI corresponding to the job set selected by the user.

Figure 11:
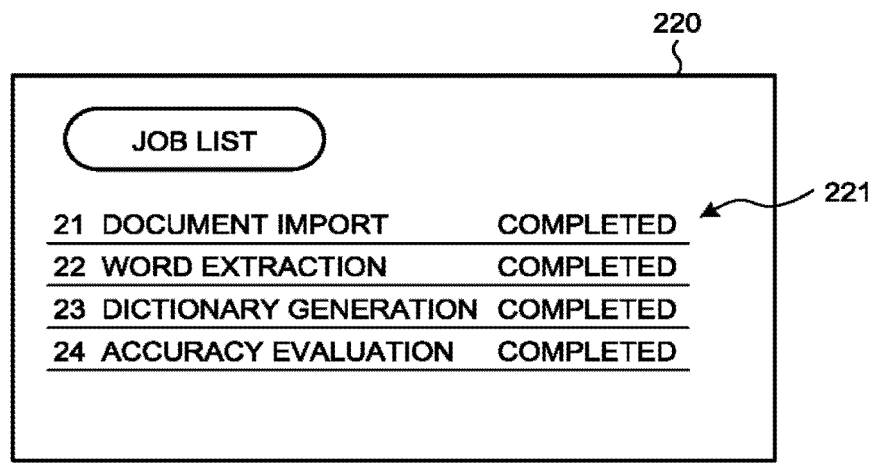
FIG. 11 is a diagram illustrating an example of a job set details UI.

FIG. 11 is a diagram illustrating an example of the job set details UI. If the user performs an operation to select, for example, "word dictionary creation" having a job set ID of "9" from the completed/running job set list 201 on the dashboard UI 200 in FIG. 8, a job set details UI 220 such as that illustrated in FIG. 11 is displayed on the display device of the client terminal used by the user.

This job set details UI 220 includes a job list 221 as illustrated in FIG. 11. The job list 221 is a list that displays executed jobs included in the job set selected by the user in a selectable manner, and displays job IDs, names, and statuses of the respective executed jobs. If the user performs an operation to select any of the executed jobs displayed on the job list 221, the job UI displayed on the display device of the client terminal shifts from the job set details UI 220 to a job details UI corresponding to the executed job selected by the user.

Figure 12:
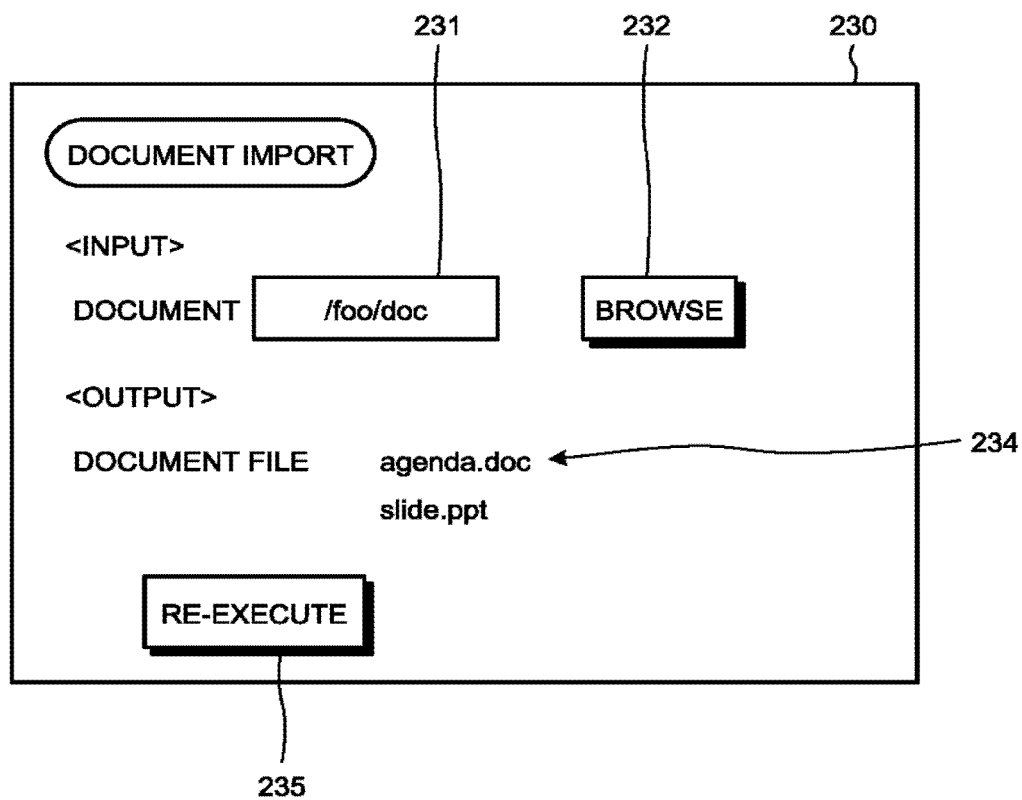
FIG. 12 is a diagram illustrating an example of a job details UI.

FIG. 12 is a diagram illustrating an example of the job details UI. If the user performs an operation to select, for example, "document import" having a job ID of "21" from the job list 221 on the job set details UI 220 in FIG. 11, a job details UI 230 such as that illustrated in FIG. 12 is displayed on the display device of the client terminal used by the user.

As illustrated in FIG. 12, this job details UI 230 includes a text box 231 and a "browse" button 232 for displaying input data of the executed job selected by the user in a correctable manner, an output display area 234 for displaying output data of the executed job selected by the user, and a "re-execute" button 235 for instructing re-execution of the executed job. If the user corrects the input data of the executed job using the text box 231 and the "browse" button 232 and operates the "re-execute" button 235 on the job details UI 230, the job executor 121 is started, and the job is re-executed using the corrected input data. If the job instructed for re-execution is not the last job in the job set, jobs subsequent to the job instructed for re-execution are sequentially executed.

Figure 13:
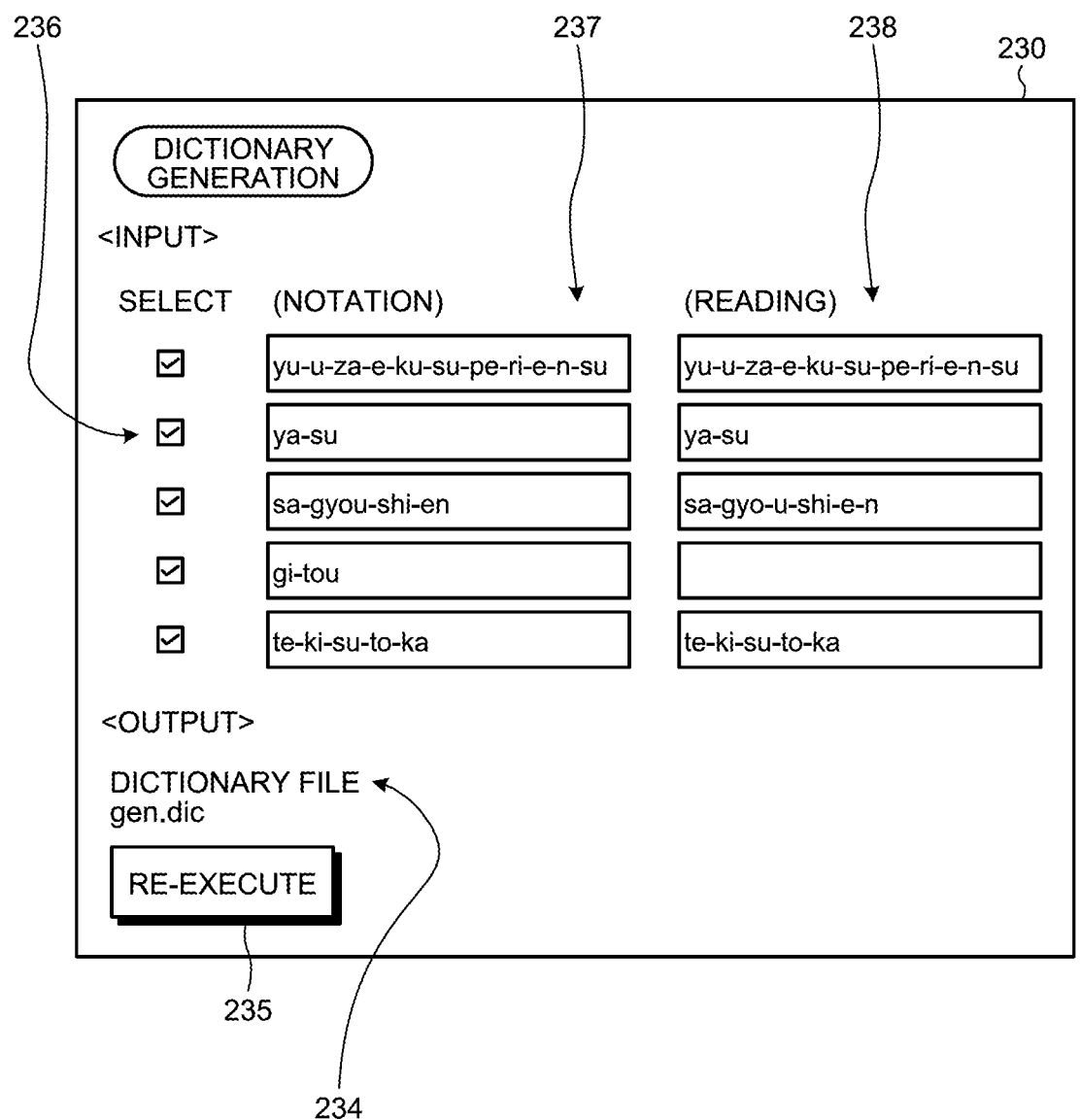
FIG. 13 is a diagram illustrating another example of the job details UI.

FIG. 13 is a diagram illustrating an example of the job details UI corresponding to a job the input data of which has a list form. If the user performs an operation to select, for example, "dictionary generation" having a job ID of "23" from the job list 221 on the job set details UI 220 in FIG. 11, the job details UI 230 such as that illustrated in FIG. 13 is displayed on the display device of the client terminal used by the user.

As illustrated in FIG. 13, the job details UI 230 corresponding to the job the input data of which has a list form includes, in a manner corresponding to each of the elements in the list of the input data, a check box 236 for selecting the element as input data to be used when the job is re-executed, text boxes 237 and 238 for displaying the input data in a correctable manner, the output display area 234, and the "re-execute" button 235. In the example in FIG. 13, each of the elements in the list of the input data is composed of two items of "notation" and "reading". Consequently, the text boxes for displaying the input data in a correctable manner include the text box 237 corresponding to the "notation" and the text box 238 corresponding to the "reading". If the user performs editing, such as unchecking the check box 236 corresponding to input data determined to be unnecessary by the user or correcting input data of an executed job using the text boxes 237 and 238, on this job details UI 230, and operates the "re-execute" button 235, the job executor 121 is started, and the job is re-executed using the corrected input data. If the job instructed for re-execution is not the last job in the job set, jobs subsequent to the job instructed for re-execution are sequentially executed.

The above-described user operations using the job UI are recorded by the operation history recorder 122 as the job operation history 162 in the history DB 160.

Figure 14:
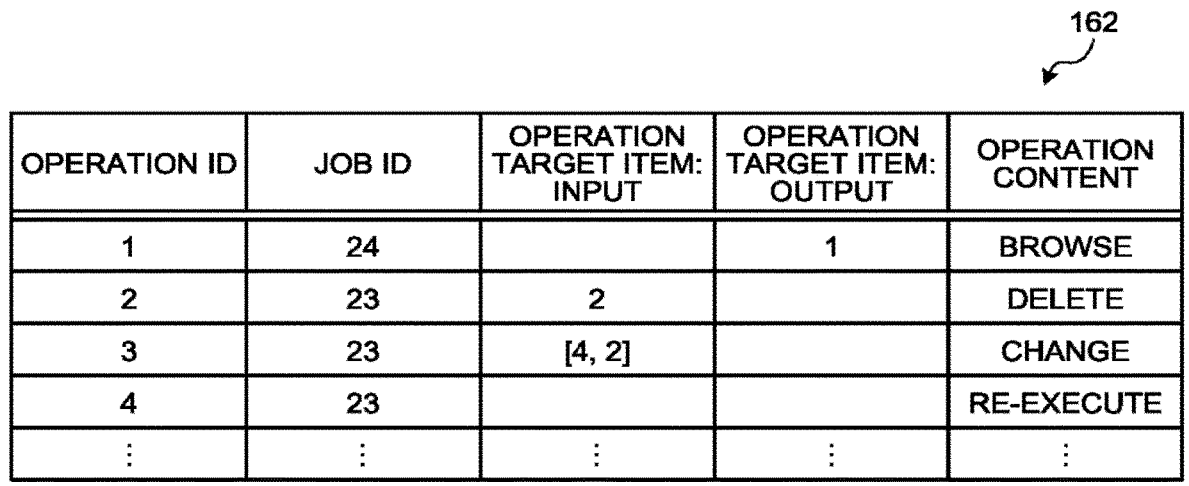
FIG. 14 is a diagram illustrating an example of a job operation history.

FIG. 14 is a diagram illustrating an example of the job operation history 162. As illustrated in FIG. 14, the job operation history 162 is recorded in the history DB 160 in a table form associating an "operation ID", the "job ID", an "operation target item: input", an "operation target item: output", and an "operation content" with one another.

The operation ID is identification information uniquely assigned to each individual user operation executed using the job UI. The job ID is identification information on a job that has been subjected to the user operation, and the same value as a job ID included in the job execution history 161 is recorded as the job ID. If the user operation is an operation to input data, the number for an element of the input data that has been subjected to the user operation is recorded as the operation target item: input. If the user operation is an operation to output data, the number for an element of the output data that has been subjected to the user operation is recorded as the operation target item: output. The number for the element is represented as "1" if the number of elements of the input data or the output data is one, or represented as a numerical value indicating the order of the element if the input data or the output data has a list form. If one element includes a plurality of items (such as the "notation" and the "reading" of one word), and only any one of the items serves as the operation target item, the operation target item: input or the operation target item: output is recorded in the form of [element number, item number]. The content of the user operation (what kind of operation has been performed) is recorded as the operation content.

FIG. 14 illustrates the example of the job operation history 162 that is recorded in the history DB 160 if the user performs the following operations using the job UI.

That is, the user first opens the job details UI 230 corresponding to the "accuracy evaluation" having a job ID of "24", and refers to a "character accuracy rate" serving as the output data thereof. Whether the user has referred to certain input data or certain output data on the job UI may be recorded such that, if the user has performed an operation to open the job details UI 230, all the input data and the output data of a job corresponding to the job details UI 230 have been referred to, or may be recorded such that, based on a condition, for example, that a time during which certain input data or certain output data has been displayed in a window of the browser has exceeded a certain time, the input data or the output data has been referred to.

Then, the user opens the job details UI 230 (refer to FIG. 13) corresponding to the "dictionary generation" having a job ID of "23", and performs an operation to delete the second element (element for which the notation and the reading are "ya-su ( やす )") of the input data (operation to uncheck the check box 236). In addition, the user performs an operation to change the second item, that is the reading, of the fourth element (element for which the notation is "gi-tou ( 技続 )" and the reading is blank) from blank to "gi-tou ( ぎとう )". After editing the input data as described above, the user operates the "re-execute" button 235 to instruct the re-execution of the job of the "dictionary generation".

Figure 15:
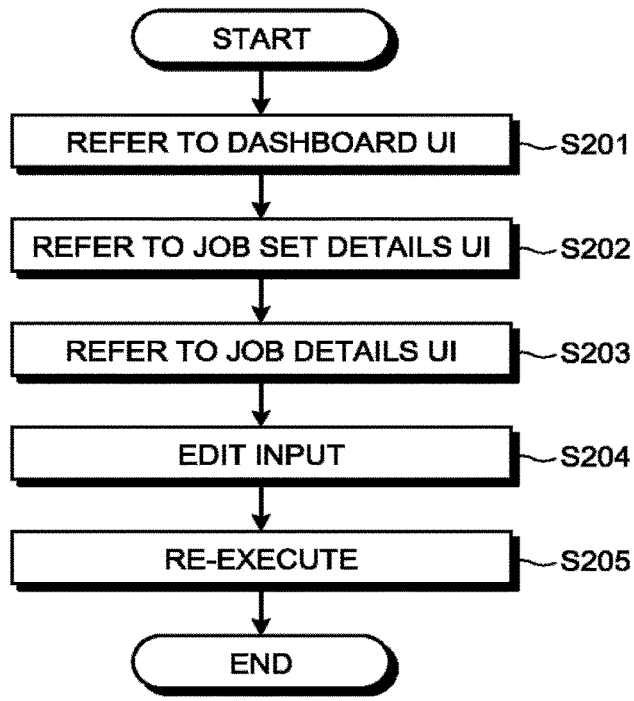
FIG. 15 is a flowchart illustrating an operation procedure of a user when a job is re-executed.

FIG. 15 is a flowchart illustrating an operation procedure of the user when the job is re-executed. The user first refers to the dashboard UI 200 displayed on the display device of the client terminal, and selects a desired job set from the completed/running job set list 201 (Step S201). This operation shifts the job UI displayed on the display device of the client terminal from the dashboard UI 200 to the job set details UI 220 corresponding to the job set selected by the user on this dashboard UI 200.

The user then refers to the job set details UI 220 displayed on the display device of the client terminal, and selects a desired executed job from the job list 221 (Step S202). This operation shifts the job UI displayed on the display device of the client terminal from the job set details UI 220 to the job details UI 230 corresponding to the executed job selected by the user on this job set details UI 220.

The user then refers to the job details UI 230 displayed on the display device of the client terminal (Step S203), and edits the input data as needed (Step S204). After editing the input data, the user operates the "re-execute" button 235 on the job details UI 230 to instruct the re-execution of the job (Step S205). This operation causes the job executor 121 to re-execute the job instructed for re-execution, and to record the new job execution history 161 in the history DB 160. The above-described user operations are recorded by the operation history recorder 122 as the job operation history 162 in the history DB 160.

The warning condition generator 130 generates the warning condition for the input data or the output data based on the job execution history 161 and the job operation history 162 recorded in the history DB 160 as described above. In the present embodiment, a tendency of user operations to the input data or the output data when the executed job is re-executed is learned through the machine learning, and a condition representing such a tendency of user operations is generated as the warning condition. The type definition 154 illustrated in FIG. 5 indicates which feature of the input data or the output data is to be focused in order to generate the learning data used in the machine learning. That is, if the input data or the output data is of a folder type, the number of files included in the folder is used as the feature; if the input data or the output data is of a file type, the size of the file is used as the feature; if the input data or the output data is of a character string type, the character string length of the character string is used as the feature; or if the input data or the output data is of a ratio type, the numerical value of the ratio is used as the feature.

The warning condition generator 130 first uses the job execution history 161 and the job operation history 162 recorded in the history DB 160 to record the feature history 163 representing the features of the input data and the output data of all the executed jobs in the history DB 160. In the feature history 163, each of the feature of the input data and the feature of the output data is recorded for each of the executed jobs having a common job definition ID, and, if the input data or the output data has a list form, the feature of each element of the list is recorded. If each of the elements of the list includes a plurality of items, the feature of each of the elements may be separately recorded for each of the items.

Figure 16:
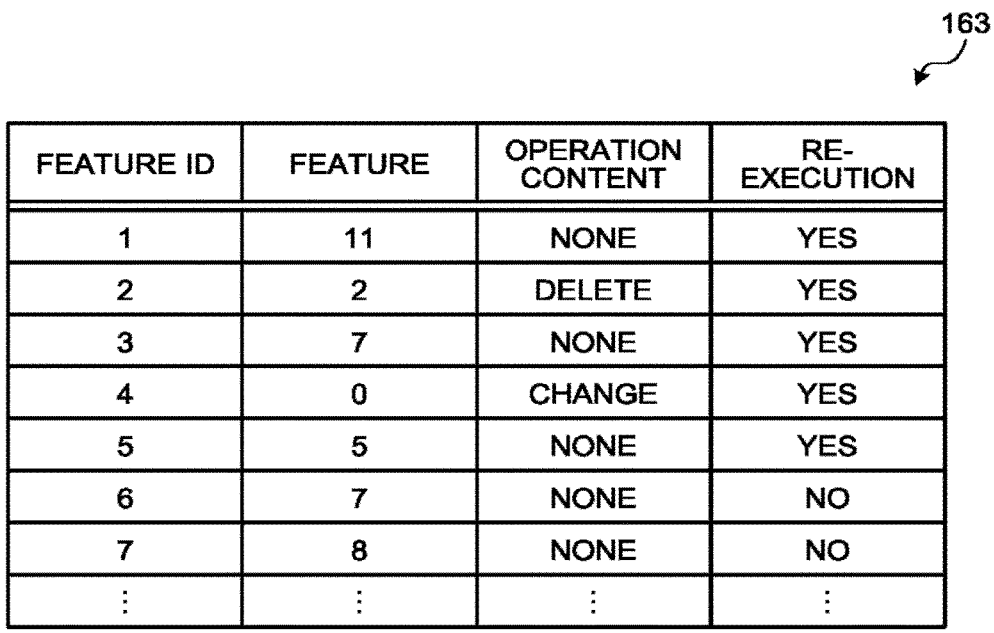
FIG. 16 is a diagram illustrating an example of a feature history.

FIG. 16 is a diagram illustrating an example of the feature history 163. As illustrated in FIG. 16, the feature history 163 is recorded in the history DB 160 in a table form associating a "feature ID", the "feature", the "operation content", and a "re-execution" with one another.

The feature ID is identification information uniquely assigned to each individual feature recorded as the feature history 163. The feature represents the value of the feature. The operation content represents what kind of user operation has been applied to the element of the input data or the output data representing the feature, and the same value as the operation content of the job operation history 162 is recorded if the user operation has been applied, or "None" is recorded if no user operation has been applied. The "re-execution" represents whether the executed job has been re-executed using the input data or the output data representing the feature, and "Yes" is recorded if the re-execution has been performed, or "No" is recorded if no re-execution has been performed.

The feature history 163 illustrated in FIG. 16 represents an example of the feature history 163 targeted to the reading in the list of words serving as the input data of the "dictionary generation" job. The operation of deletion of the "ya-su ( やす )" illustrated in FIGS. 13 and 14 is recorded in the row of the feature ID of "2" in FIG. 16 as a history indicating that the deletion has been applied to a word having a character string length of "2" as a feature. The change operation of filling the blank item with the reading of the notation "gi-tou ( 技続 )" illustrated in FIGS. 13 and 14 is recorded in the row of the feature ID of "4" in FIG. 16 as a history indicating that the change has been applied to a word having a character string length of "0" as a feature.

Using, for example, the feature history 163 as described above, the warning condition generator 130 attaches a label indicating a target of warning to the features of the corrected input data and the referenced output data of the executed job that has been re-executed in response to the user operation, attaches a label indicating a non-target of warning to the features of the input data and the output data of other executed jobs that have not been re-executed, and generates the learning data for the machine learning. Through the machine learning using the learning data, the warning condition generator 130 generates, for example, the model of the classifier corresponding to the warning condition 171 for the input data or the output data.

For example, a classification method in the machine learning can be used as a method for learning the warning condition 171. In this case, the warning condition 171, such as a linear discriminant function, can be obtained by classifying the features of the input data and the output data to which at least either of operation and job re-execution has not been applied as a class of non-target warning, and classifying the features of the input data and the output data to which operation and job re-execution have been applied as a class of target of warning, and by performing the machine learning using the above-described learning data. The learning of the warning condition 171 may be performed at the time when the executed job is re-executed, or may be periodically performed at a predetermined frequency, such as once a day.

The feature history 163 used for the above-described generation of the learning data may be recorded as needed by the warning condition generator 130 each time the job execution history 161 or the job operation history 162 is recorded, or may be recorded with reference to the job execution history 161 or the job operation history 162 in accordance with the timing of learning of the warning condition 171. Instead of recording the feature history 163 in the history DB 160, the warning condition generator 130 may generate the learning data based on the job execution history 161 or the job operation history 162 recorded in the history DB 160 with reference to the type definition 154 stored in the definition DB 150 at the time of learning of the warning condition 171.

The learning data as a target of warning may be generated using all the features of the input data and the output data to which operation and job re-execution have been applied. Alternatively, the skill level of editing operation of each user may be managed, and the learning data as a target of warning may be generated in response to only operations performed by users having skill levels at a reference value or higher. The learning data as a non-target of warning may be generated by randomly selecting a feature sufficient for performing the machine learning from among the features of the input data and the output data to which at least either of operation and job re-execution has not been applied.

To determine whether a certain feature is classified as the class of target of warning, certain output data indicating whether an operation result of a job set is good may be used instead of the re-execution operation. For example, if the character accuracy rate of a generated dictionary represents the quality of the operation result of the job set and is a certain value or higher, information indicating that the operation result is good may be entered in the job definition 152, and the condition thereof may be used as a substitute for the information as to whether the re-execution operation has been performed.

Instead of using the features, the target data itself may be used as the learning data for the warning condition 171. In this case, other information, such as a result of the morphological analysis on a character string, may be added.

Figure 17:
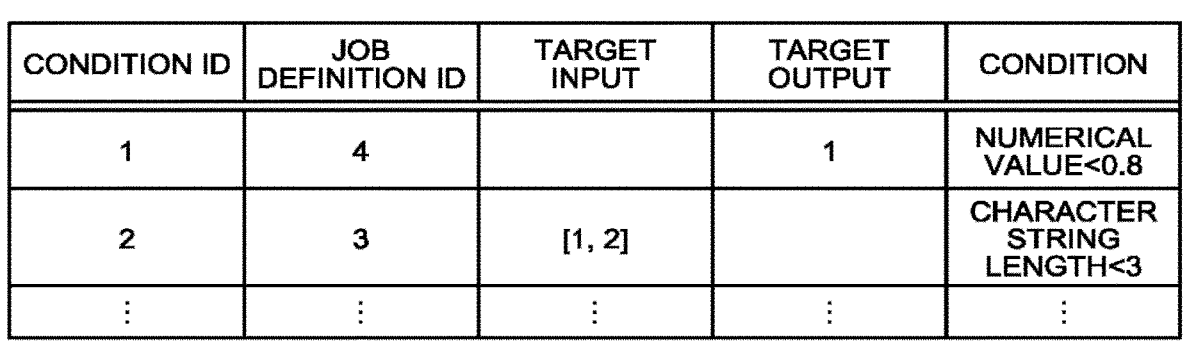
FIG. 17 is a diagram illustrating examples of a warning condition.

FIG. 17 is a diagram illustrating examples of the warning condition 171. As illustrated, for example, in FIG. 17, the warning condition 171 is stored in the condition DB 170 in a table form associating a "condition ID", the "job definition ID", a "target input", a "target output", and a "condition" with one another.

The condition ID is identification information uniquely assigned to each individual element of the warning condition 171. The job definition ID represents which of the job definitions 152 corresponds to a job serving as a target of the warning condition 171. The target input represents a number for an element of input data that serves as a target if the warning condition 171 is targeted at the input data of the job. The target output represents a number for an element of output data that serves as a target if the warning condition 171 is targeted at the output data of the job. The number for the element is represented as "1" if the number of elements of the input data or the output data is one, or represented as a numerical value indicating the order of the element if the input data or the output data has a list form. If one element includes a plurality of items (such as the "notation" and the "reading" of one word), and only any one of the items serves as the operation target item, the target input or the target output is represented in the form of [element number, item number]. The condition represents a specific condition, such as a linear discriminant function.

The example illustrated in FIG. 17 indicates that the warning condition 171 for the condition ID of "1" is targeted at the first element in the output data of the "accuracy evaluation" job having a job definition ID of "4", that is, at the "character accuracy rate" having a "data definition ID" of "6" (refer to FIGS. 3 and 4), and that the output data is subjected to a warning if the numerical value of the "character accuracy rate" is lower than 0.8. The example also indicates that the warning condition 171 for the condition ID of "2" is targeted at the second item of the first element in the input data of the "dictionary generation" job having a job definition ID of "3", that is, at the "reading" of a "word (having a list form)" having a data definition ID of "3" (refer to FIGS. 3 and 4), and that the input data is subjected to a warning if the character string length of the "reading" of the "word" is smaller than 3.

The warning condition 171 is not limited to being defined by a conditional expression for a single parameter such as those illustrated in FIG. 17. For example, the warning condition 171 may be a conditional expression that takes into account a plurality of parameters, such as the "notation" and the "reading" of the "word (having a list form)" serving as the input data of the "dictionary generation" job, or may have a form of a model (parameter set) given to a support vector machine (SVM) or a Bayes classifier.

The warning condition 171 generated by the warning condition generator 130 is reflected by the display controller 111 as a warning to an executed job presented to the user on the job UI. That is, with reference to the warning condition 171 stored in the condition DB 170, the display controller 111 displays, on the display device of the client terminal, the job UI on which the warning information is appended to the executed job, among the executed jobs presented to the user on the job UI, the input data or the output data of which satisfies the warning condition 171.

Figure 18:
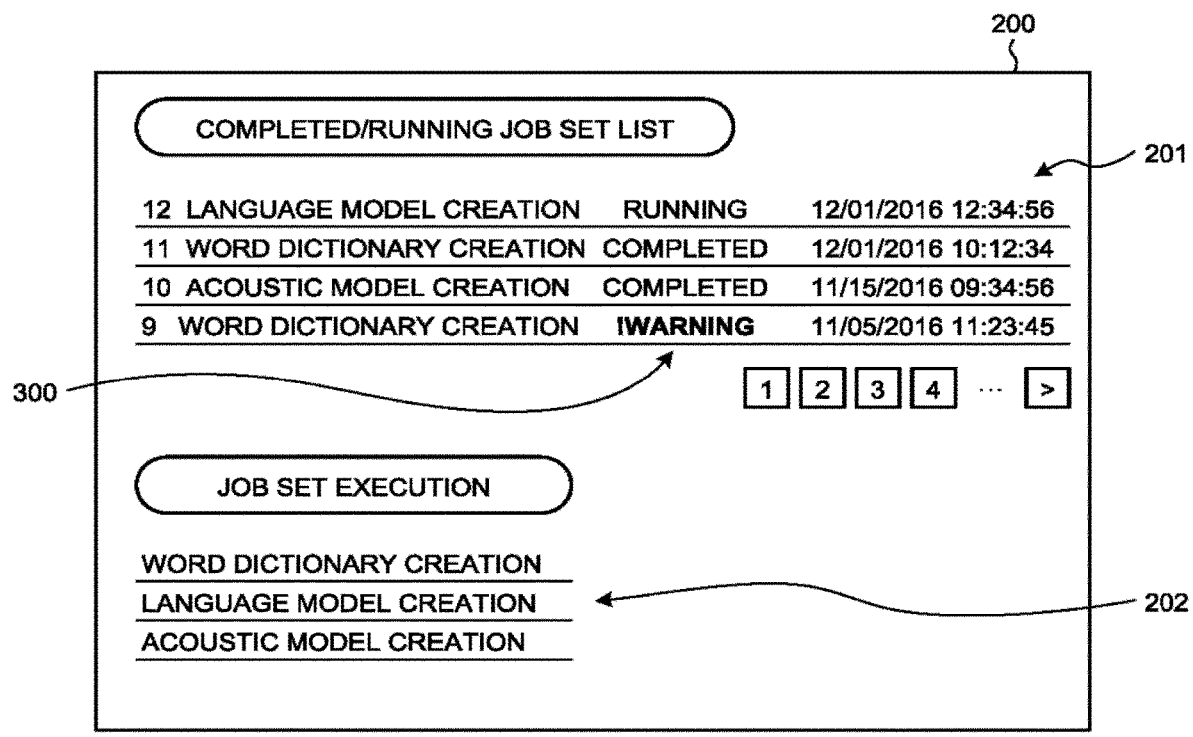
FIG. 18 is a diagram illustrating a presentation example of warning information.

FIG. 18 is a diagram illustrating a presentation example of the warning information, and illustrates the example in which the warning information is appended on the dashboard UI 200. If the user opens the dashboard UI 200 after the warning condition 171 is generated by the warning condition generator 130, the display controller 111 refers to the job execution history 161 in the history DB 160 and the warning condition 171 in the condition DB 170, and checks whether a job set including an executed job the input data or the output data of which satisfies the warning condition 171 is present among the job sets displayed in the completed/running job set list 201. If an executed job the input data or the output data of which satisfies the warning condition 171 is present, the display controller 111 changes the display of the status of the job set to, for example, "!warning", and displays the status. That is, in the example in FIG. 18, warning information 300 for the executed job included in the job set is appended as the display of the status of the job set in the completed/running job set list 201, and is presented to the user.

Figure 19:
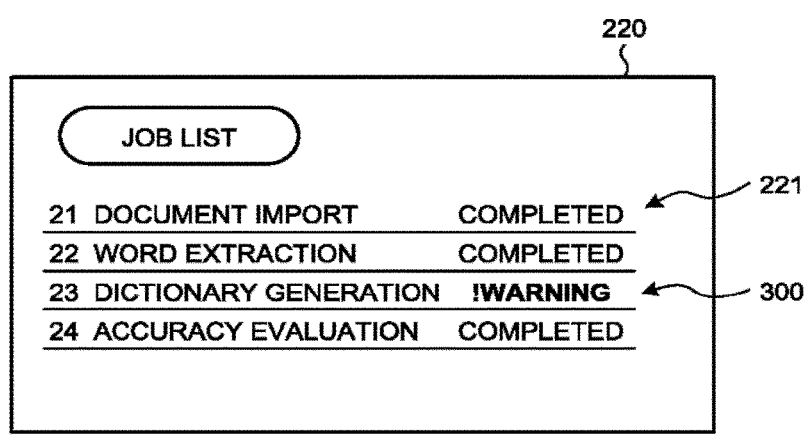
FIG. 19 is a diagram illustrating another presentation example of the warning information.

FIG. 19 is a diagram illustrating another presentation example of the warning information, and illustrates the example in which the warning information is presented on the job set details UI 220. If the user selects the job set with the status of "!warning" from the completed/running job set list 201 on the dashboard UI 200, the display controller 111 displays the job set details UI 220 such as that illustrated in FIG. 19. In this job set details UI 220, the display of the status of the executed job, among the executed jobs displayed in the job list 221, the input data or the output data of which satisfies the warning condition 171 has been changed to "!warning". That is, in the examples in FIG. 19, the warning information 300 for the executed job is appended as the display of the status of the executed job in the job list 221, and is presented to the user.

Figure 20:
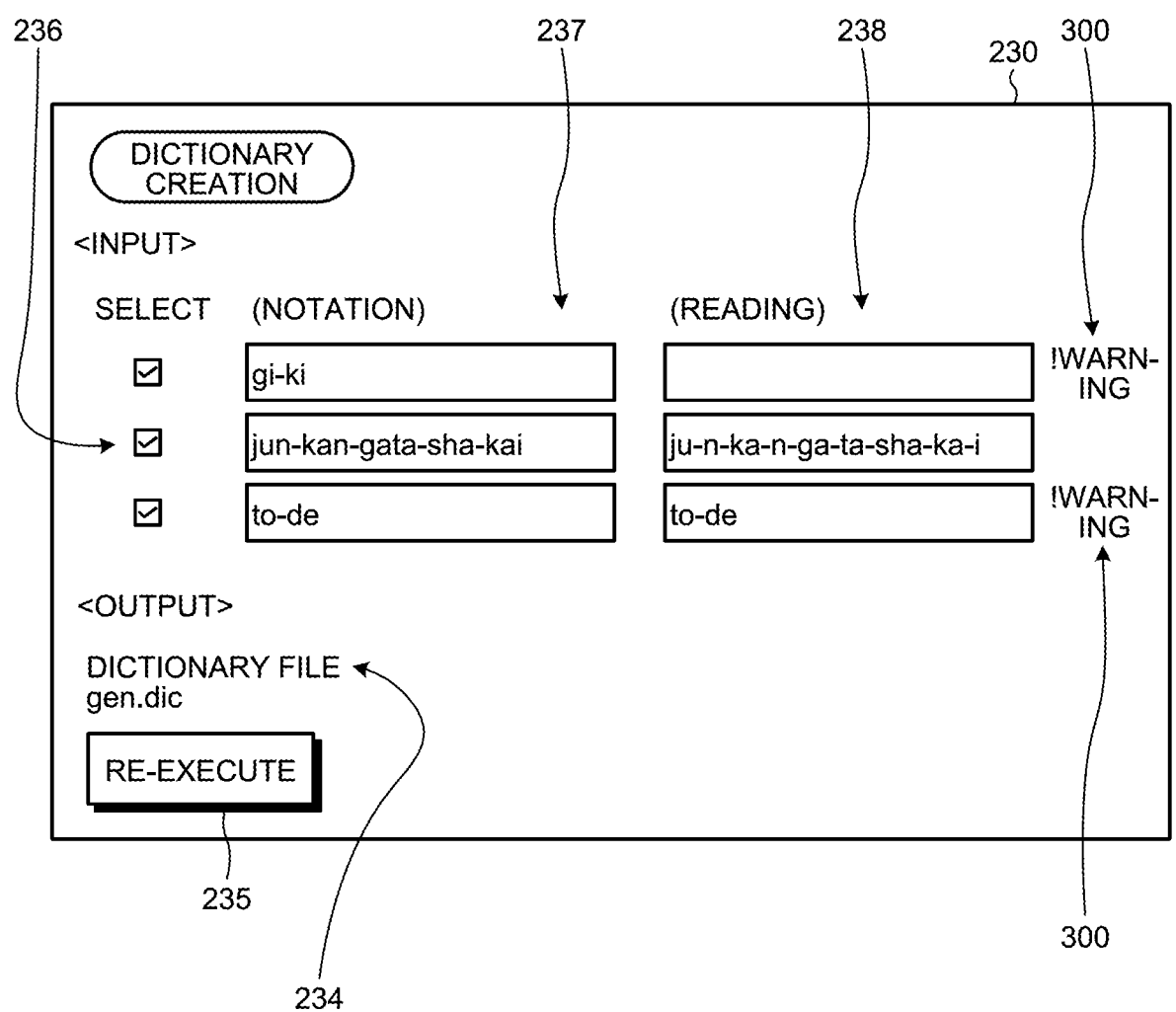
FIG. 20 is a diagram illustrating still another presentation example of the warning information.

FIG. 20 is a diagram illustrating still another presentation example of the warning information, and illustrates the example in which the warning information is presented on the job details UI 230. If the user selects the job with the status of "!warning" from the job list 221 on the job set details UI 220, the display controller 111 displays the job details UI 230 such as that illustrated in FIG. 20. This job details UI 230 illustrated in FIG. 20 indicates an example of the job details UI 230 corresponding to a job the input data of which has a list form, and display of "!warning" is appended to elements satisfying the warning condition 171 in the list of the input data. That is, in the examples in FIG. 20, the warning information 300 for the executed job is appended as the display of "!warning" appended to the elements of the input data satisfying the warning condition 171, and is presented to the user.

Figure 21:
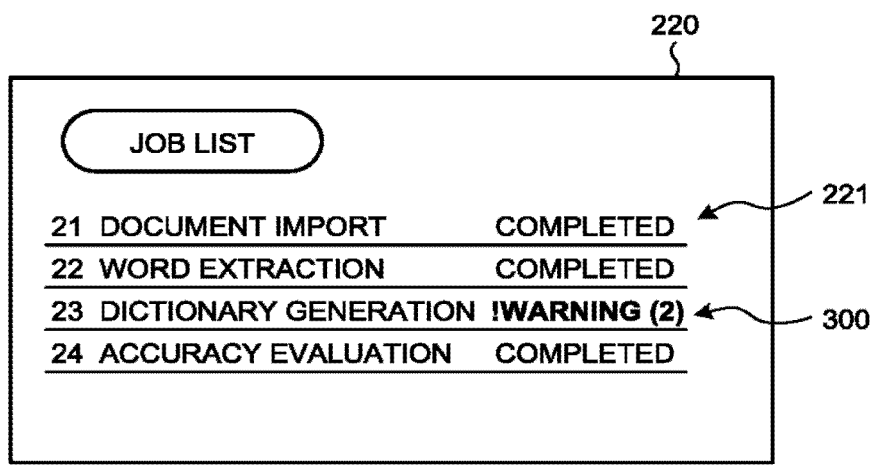
FIG. 21 is a diagram illustrating still another presentation example of the warning information.

The display controller 111 may append and present to the user the warning information 300 including information indicating the number of pieces of input data (or elements thereof in the case of a list form) satisfying the warning condition 171 or the number of pieces of output data (or elements thereof in the case of a list form) satisfying the warning condition 171 in the job set or the executed jobs subjected to a warning. For example, as illustrated in FIG. 21, if the warning information 300 is appended on the job set details UI 220, the warning information 300 can indicate that two of the pieces of input data or output data (or two elements thereof in the case of a list form) of the executed job satisfy the warning condition 171 by displaying the status of the executed job subjected to a warning as "!warning(2)".

If the warning condition 171 has a form that is capable of outputting a degree of need for warning for a certain feature as likelihood, the display controller 111 may append and present to the user the warning information 300 having different forms depending on the likelihood. For example, the warning information 300 representing a normal warning may be appended if the likelihood is equal to or higher than a first threshold, or the warning information 300 representing a more important warning may be appended if the likelihood is equal to or higher than a second threshold higher than the first threshold. The difference in form of the warning information 300 can be represented as a difference in display mode, such as character, symbol, color, or blinking.

As described above in detail by way of specific examples, the job execution control device 100 of the present embodiment generates the warning condition 171 for the input data or the output data of the job based on the job execution history 161 and the job operation history 162. If an executed job the input data or the output data of which satisfies the warning condition 171 is present among the executed jobs presented to the user through the job UI, the job UI displays the executed job with the warning information 300 appended thereto. Consequently, the job execution control device 100 of the present embodiment can appropriately support the re-execution of the job by making the user aware of the executed job to be considered to be re-executed.

For example, if the job set of "word dictionary creation" is executed, the finally obtained product is a word dictionary. However, even if each of the jobs included in this job set is normally executed, the word dictionary as the product may be unsatisfactory for the user in some cases. In those cases, the user performs operations, such as correcting the input data of a job included in the job set and instructing the re-execution of the job. However, previously, the user is often unable to understand how to correct which input data of which job. In contrast, the job execution control device 100 of the present embodiment generates the warning condition 171 by learning the tendency of the user operations applied to the input data and the output data when the executed job was re-executed in the past, appends the warning information 300 to the executed job the input data or the output data of which satisfies the warning condition 171, and presents the result to the user. Thus, the job execution control device 100 of the present embodiment can appropriately support the re-execution of the job by making the user aware of the executed job to be considered to be re-executed.

The job execution control device 100 of the present embodiment can be implemented, for example, by cooperation of hardware constituting a general computer and a program (software) executed on the computer. For example, a computer can execute a certain program to implement functional components, such as the UI controller 110 (the display controller 111 and the operation receiver 112), the job manager 120 (the job executor 121 and the operation history recorder 122), and the warning condition generator 130, which have been described above. Databases, such as the definition DB 150, the history DB 160, and the condition DB 170 described above, can be implemented using a storage device included in the computer.

Figure 22:
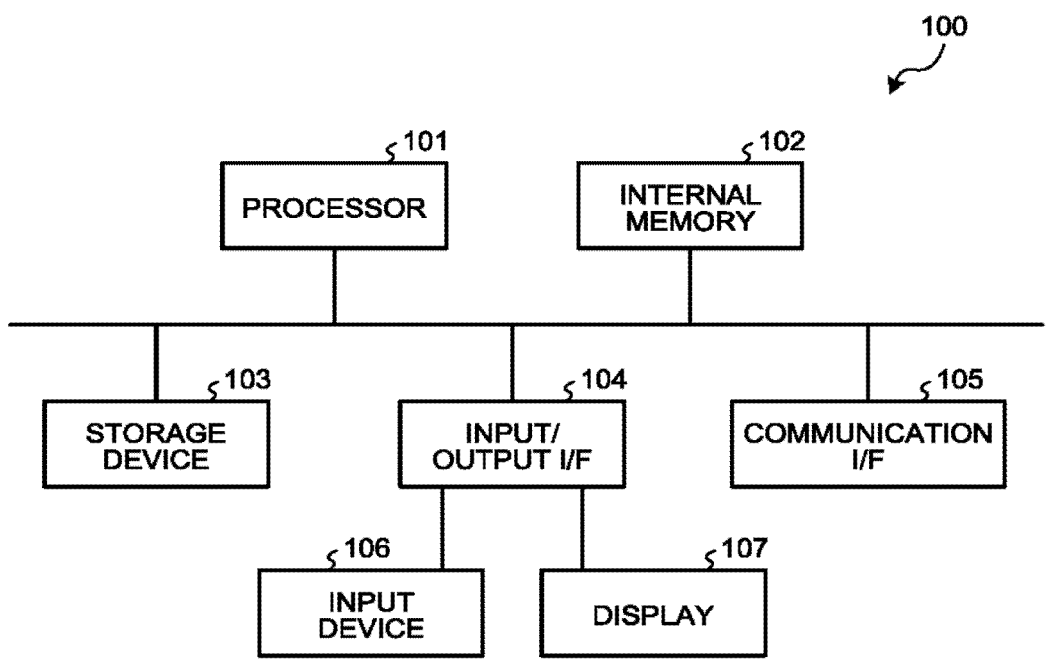
FIG. 22 is a block diagram illustrating a hardware configuration example of the job execution control device.

FIG. 22 is a block diagram illustrating a hardware configuration example of the job execution control device 100 of the present embodiment. As illustrated, for example, in FIG. 22, the job execution control device 100 of the present embodiment includes a processor 101 including, for example, a central processing unit (CPU) and a graphics processing unit (GPU), internal memories 102 such as a random access memory (RAM) or a read-only memory (ROM), a storage device 103 such as a hard disk drive (HDD) or a solid state drive (SDD), an input/output interface (I/F) 104 for connecting peripheral devices such as an input device 106 and a display 107, and a communication I/F 105 that communicates with external devices such as the client terminal. The processor 101 can implement the above-described functional components, for example, by executing a program stored in the storage device 103 or the internal memory 102 while using the internal memory 102.

That is, the parts indicated as the functional components of the job execution control device 100 according to the present embodiment are included in the program to be executed by the computer, and one or more processors (the processor 101 in FIG. 22) included in the computer execute the program to generate the above-described parts in the main memory (the internal memory 102 in FIG. 22) such as the RAM.

The above-described program to be executed by the computer is provided by being recorded on a recording medium including a magnetic disk (such as a flexible disk, or a hard disk), an optical disc (such as a CD-ROM, a CD-R, a CD-RW, a DVD-ROM, a DVD+R/-R, a DVD+RW/-RW, or a Blu-ray (registered trademark) disc), and a semiconductor memory. The recording medium for recording the program may have any storage format as long as being a computer-readable recording medium, which may be provided as a computer program product. The above-described program may be installed in advance on the computer, or the above-described program may be distributed through a network and installed on the computer as appropriate.

The job execution control device 100 of the present embodiment may be configured to implement one, some, or all of the above-described functional components using special-purpose hardware, such as an application specific integrated circuit (ASIC) or a field-programmable gate array (FPGA).

The job execution control device 100 of the present embodiment may be configured as a network system formed by connecting a plurality of computers in a communicable manner, and may be configured to implement the above-described functional component in a manner distributed among the computers. The job execution control device 100 of the present embodiment may be a virtual machine operating in a cloud system. The job execution control device 100 of the present embodiment is not limited to the example of being implemented as a server of a server-client system using a network, but may be implemented by an information processing device, such as a personal computer used by a user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A job execution control device to control execution of a job serving as a unit of processing of receiving input data, applying processing thereto, and outputting output data representing a result of the processing, the device comprising:
    processing circuitry configured to function as:
    a job executor configured to execute a specified job and record a job execution history including the input data and the output data of the executed job;
    a display controller configured to display, on a display device, a job screen for presenting information on the executed job to a user and for receiving a user operation for re-executing the executed job;
    an operation history recorder configured to record a job operation history including an operation target item and operation content of the user operation performed using the job screen; and
    a warning condition generator configured to generate a warning condition for input data or output data of a job based on the job execution history and the job operation history, wherein
    the display controller is configured to append warning information to the job screen, the warning information being associated with an executed job the input data or the output data of which satisfies the warning condition, among executed jobs presented to the user through the job screen, and
    the display controller is configured to display the job screen with the warning information on the display device, wherein
    the warning condition generator is configured to:
    generate learning data using features of corrected input data and referenced output data of the executed job that has been re-executed in response to the user operation, and using features of the input data and output data of other executed jobs that have not been re-executed, the features being features according to types of the input data and the output data, and
    generate a model of a classifier corresponding to the warning condition through machine learning using the learning data.

2. The device according to claim 1, wherein
the job screen includes
    a first screen for presenting to the user a list of executed job sets each serving as a set of executed jobs that have been sequentially executed,
    a second screen configured to present to the user a list of executed jobs included in an executed job set selected from the first screen, and
    a third screen that includes the output data and the output data of an executed job selected from the second screen and that is configured to receive a user operation to correct the input data and re-execute the executed job.

3. The device according to claim 2, wherein the display controller is configured to append the warning information that enables identification of the executed job the input data or the output data of which satisfies the warning condition, to the list of the executed jobs presented to the user through the second screen.

4. The device according to claim 2, wherein the display controller is configured to append to the third screen the warning information that enables identification of the input data or the output data satisfying the warning condition.

5. The device according to claim 2, wherein the display controller is configured to append the warning information that enables identification of an executed job set including the executed job the input data or the output data of which satisfies the warning condition, to the list of the executed job sets presented to the user through the first screen.

6. The device according to claim 1, wherein the warning information includes number of pieces of the input data or the output data that satisfy the warning condition.

7. The device according to claim 1, wherein
the warning information includes likelihood of a warning, and
the display controller is configured to append to the job screen the warning information having different forms depending on the likelihood and being associated with the executed job the input data or the output data of which satisfies the warning condition.

8. A job execution control method executed by a job execution control device to control execution of a job serving as a unit of processing of receiving input data, applying processing thereto, and outputting output data representing a result of the processing, the method comprising:

executing a specified job;

recording a job execution history including the input data and the output data of the executed job;

displaying, on a display device, a job screen for presenting information on the executed job to a user and for receiving a user operation for re-executing the executed job;

recording a job operation history including an operation target item and operation content of the user operation performed using the job screen;

generating a warning condition for input data or output data of a job based on the job execution history and the job operation history; and when the warning condition is generated, appending warning information to the job screen, the warning information being associated with an executed job the input data or the output data of which satisfies the generated warning condition, among executed jobs presented to the user through the job screen, and displaying the job screen with the warning information on the display device, wherein the generating including:

generating learning data using features of corrected input data and referenced output data of the executed job that has been re-executed in response to the user operation, and using features of the input data and output data of other executed jobs that have not been re-executed, the features being features according to types of the input data and the output data, and generating a model of a classifier corresponding to the warning condition through machine learning using the learning data.

9. A computer program product comprising a non-transitory computer-readable medium containing a program, wherein the program, when executed by a computer that controls execution of a job serving as a unit of processing of receiving input data, applying processing thereto, and outputting output data representing a result of the processing, causes the computer to execute:

executing a specified job;

recording a job execution history including the input data and the output data of the executed job;

displaying, on a display device, a job screen for presenting information on the executed job to a user and for receiving a user operation for re-executing the executed job;

recording a job operation history including an operation target item and operation content of the user operation performed using the job screen;

generating a warning condition for input data or output data of a job based on the job execution history and the job operation history; and when the warning condition is generated, appending warning information to the job screen, the warning information being associated with an executed job the input data or the output data of which satisfies the generated warning condition, among executed jobs presented to the user through the job screen, and displaying the job screen with the warning information on the display device, wherein the generating including:

generating learning data using features of corrected input data and referenced output data of the executed job that has been re-executed in response to the user operation, and using features of the input data and output data of other executed jobs that have not been re-executed, the features being features according to types of the input data and the output data, and generating a model of a classifier corresponding to the warning condition through machine learning using the learning data.

\* \* \* \* \*